June 1, 1965

L. S. LEWIS 3,187,198

SEMICONDUCTOR PULSE CONTROL CIRCUIT

Filed Dec. 6, 1961

INVENTOR.
LAWRENCE S. LEWIS
BY
Spencer E. Olson
ATTORNEY

United States Patent Office 3,187,198

Patented June 1, 1965

3,187,198

SEMICONDUCTOR PULSE CONTROL CIRCUIT

Lawrence S. Lewis, Lockport, N.Y., assignor to Sylvania Electric Products Inc., a corporation of Delaware Filed Dec. 6, 1961, Ser. No. 157,338
4 Claims. (Cl. 307—88.5)

This invention relates generally to switching circuits, and more particularly to semiconductor circuits for keying a constant current source.

Although the present circuit is adaptable to a wide variety of applications where it is desirable to produce a constant current pulse, it is particularly applicable to the control of current pulses through the selector magnet in a teletypewriter page printer or perforator, and will be described in that application. A substantially constant current flow through the selector magnet is required to give a correct readout of the binary (mark-space) information of an input signal. Variations in current will cause baud bias which tends to confuse the system and may cause incorrect selection of readout characters.

The nature of the problem will be more clearly understood by reference to FIGURE 1 which shows the seven-unit teletypewriter code for the letter R. Each code element is referred to as a bit and is twenty-two milliseconds wide for the commonly used 60 word per minute code rate. As illustrated, a positive direct current level represents a "space" bit and a zero or negative level represents a "mark" bit. The polarities chosen for the binary input to the control circuit may be reversed, of course, depending upon control circuit configuration. Regardless of the polarities of the input signal, however, a "space" bit is indicated by no current through the selector magnet and a "mark" is indicated by a current pulse. The first bit in this code is a "space," indicating the start of the character, the last 1.42 bits are a "mark" indicating "stop," and the five bits in between, space-mark-space-mark-space, indicate the letter R. Thus, each character is 7.42 bits long in this particular code. To assure correct character selection, the selector magnet must produce equally spaced bits, which in turn requires uniformity in the width and position of a baud. A baud may be described as the duration of one bit. The current pulse (mark) obtainable from a selector magnet having a nearly constant current source is shown by waveform A in FIGURE 2. Waveform B shows the distortion to baud width and position caused by a variable current source and referred to as baud bias. This bias, in turn, introduces non-uniformity in the bit spacing of the word and tends to confuse the readout system.

Several techniques have heretofore been used to control the selector magnet at the mark-space rate of the inforation input, the most commonly used system comprising a D.C. source, a current-limiting resistor, and a polar relay serially connected in the selector magnet circuit loop. The mark-space input drives the polar relay. This circuit has been found to require careful adjustment, and available relays have been observed to be quite noisy even when using mercury-wetted contacts. An alternate system used a pentode vacuum tube to eliminate the polar relay, the tube parameters being adjusted to provide the required loop current. Although this system eliminates the RF interference generated by the electromechanical relay contacts, the vacuum tube system is incompatible with transistorized equipment, which is becoming more prevalent in this field. The vacuum tube system also has size limitations, relatively poor reliability, and low efficiency due to the power requirements of filament and screen grid.

In one transistorized approach with which applicant is familiar, the transistor is used as a series switch with its collector connected to the selector magnet. An expensive, high voltage transistor is required in this arrangement, however, since the standard power source in teletypewriter systems is 150 volts. A voltage of this magnitude is required to provide a relatively constant current source for the selector magnet. If a conventional low voltage transistor were used, a lower voltage power source (50 volts, for example) would be required so as not to exceed the transistor collector voltage rating, $E_C$. Besides the disadvantage of requiring a special power source, the required lower voltage source introduces the shortcoming that the current for driving the selector magnet is not constant, and "bias" or distortion of the current pulses results. Consequently, transistorized circuits have not heretofore been used to any large extent for the control of the selector magnet in teletypewriter systems.

It is a general object of this invention to provide an improved semiconductor control circuit for keying a constant current source.

It is a more particular object of this invention to provide a noise-free constant current pulse control circuit having good reliability.

Another object is to provide a constant current pulse control circuit that is compatible with transistorized circuits, thus enabling complete transistorization of the equipment in which it is used.

Another object of this invention is to provide a solid state control circuit employing standard semiconductor components for keying a constant current source.

A still further object of the present invention is to provide a transistorized teletypewriter selector magnet control circuit which is compatible with standard teletypewriter power supply values and which is very compact, light in weight, and requires very little power.

Briefly, the present control circuit features a large resistance connected in the load current loop, a semiconductor switch serially connected to the load, and a low voltage transistor connected across the load and semiconductor switch. Application of a binary (mark-space) input to the base of the transistor controls the conduction of the transistor, and also determines whether the semiconductor switch in series with the load is "on" or "off." The current pulses through the selector magnet are thereby controlled at the rate of the binary input. The circuit arrangement enables the use of a high voltage source to provide a substantially constant load current and yet limits the peak collector voltage of the transistor to a low value.

Two embodiments applicable to teletypwriter selector magnet control are described. One circuit, suitable for 60 w.p.m. systems, employs a Zener diode connected in series with a large variable resistor in the selector magnet current loop, and a conventional low voltage transistor connected as a switch across the Zener diode and selector magnet. Application of a binary input to the transistor controls conduction of the Zener diode. In another circuit, particularly suitable for 100 w.p.m. systems, selector magnet loop switching is provided by a relatively high voltage transistor, rather than a Zener diode, serially connected to the selector magnet on the side opposite that to which the resistance is connected. A low voltage transistor is connected across the selector magnet and higher voltage transistor. The binary input to the base of the low voltage transistor is inverted and also applied to the base of the high voltage transistor to switch it in alternate fashion. With this circuit configuration the high voltage transistor is required to withstand only a portion of the total power supply voltage, and hence, may be of a standard type.

Other objects, features, and advantages of the invention will become apparent from the following description, reference being had to the accompanying drawings, in which.

Figure 3:
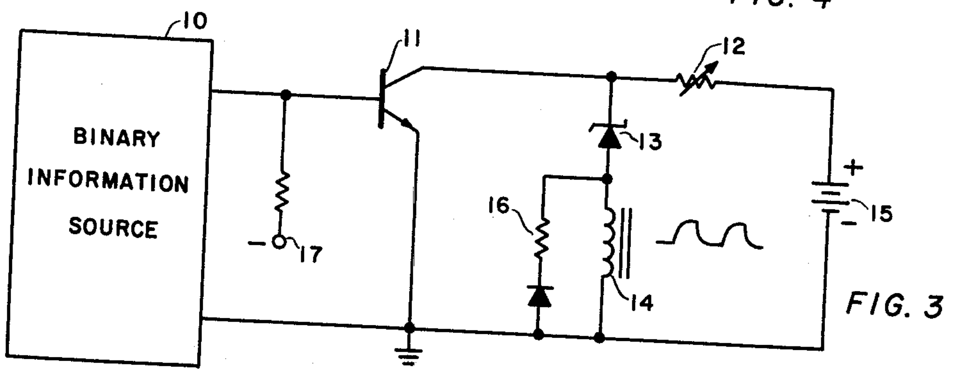
FIGURE 3 is a schematic diagram of teletypewriter selector magnet circuit incorporating one embodiment of the present control circuit.

Referring to FIGURE 3, a source 10 of binary information is connected across the base-emitter junction of a low voltage transistor 11. Although transistor 11 is normally "off" without an input signal, a negative bias source 17 may be connected to the base to insure cut-off under varying temperature conditions. In teletypewriter systems, the source 10 would usually be a converter between the receiver and the readout machine. The collector of transistor 11 is connected to the cathode of a Zener diode 13, the anode of which is connected through the selector magnet coil 14 of a teletypewriter page printer, or the like, to the negative terminal of a D.C. voltage source 15, having a value, in most systems, of 150 volts. As is well known, Zener diodes have a high impedance to current flow in the so-called "reverse" direction so long as the voltage is below the Zener value. When the voltage exceeds the Zener point, the impedance decreases sharply to a negative value and the diode conducts heavily. Reduction of the current permits the diode to "recover" and again exhibit a high impedance to current in the "reverse" direction. The positive terminal of voltage source 15 is connected through resistor 12 to the junction of the cathode terminal of Zener diode 13 and the collector of transistor 11. The values of voltage source 15 and resistor 12 are selected to maintain a substantially constant current flow. The value of resistor 12, which may be adjusted, is large enough relative to the other resistance values in the power source load circuitry that it is the principal determinant of the value of the current. Appropriate surge limiting circuitry 16, which may be a diode and a resistor connected in series, is connected in shunt with coil 14 to protect Zener diode 13 from induced voltage affects. The negative terminal of voltage source 15, the emitter of transistor 11, and one terminal of the source 10 of binary information are connected to a common reference point, illustrated as ground.

Figure 1:
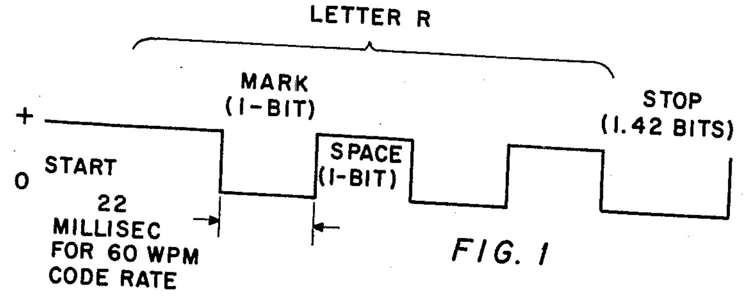
FIGURE 1 shows a typical binary waveform of a seven-unit teletypewriter code.

For purposes of describing the operation of the circuit of FIGURE 3, it will be assumed that a substantially constant current of 20 milliamperes (ma.), necessary to operate the selector magnet of a page printer, is established by resistor 12. Hence, a "mark" pulse is indicated by a current flow of 20 ma. through coil 14, and a "space" is indicated by no current flow. The pulse (current or no current) length, which is governed by the word rate of the particular teletypewriter system in which the circuit is used, will be assumed to be 22 milliseconds, a typical value for 60 w.p.m. systems in general use. Further, it will be assumed that Zener diode 13 has a reverse breakdown voltage of 3.7 volts, and that the selector magnet coil 14 voltage drop at 20 ma. is 3.0 volts. The source 10 of binary information applies a train of two valued voltage bits, similar to the waveform shown in FIGURE 1, to the base of transistor 11. A "mark" voltage bit causes transistor 11 to be cut off, and a "space" bit causes transistor 11 to conduct to saturation.

Figure 2:
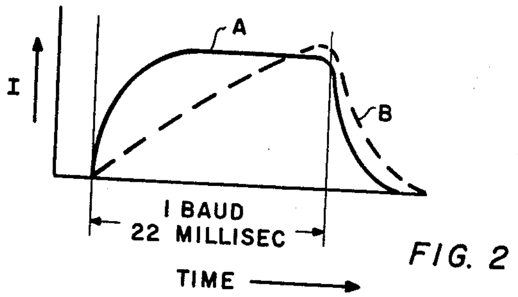
FIGURE 2 shows typical current pulse waveforms in a teletypewriter selector magnet for constant and variable current conditions.

When transistor 11 is cut off, the voltage across diode 13 exceeds the Zener voltage and the diode conducts in the reverse direction. As a result, 20 ma. of loop current flows through coil 14 to produce a "mark" pulse similar to that shown in FIGURE 2. During this "mark" condition, the transistor collector voltage is limited to the low value of 6.7 volts, the sum of the voltage drop across coil 14 and the reverse breakdown voltage of Zener diode 13. This condition represents the peak collector voltage requirement, if suitable surge limiting circuitry 16 is used.

When transistor 11 is caused to conduct to saturation by application of a "space" voltage level, it will be assumed that the collector voltage $E_C$ of transistor 11 drops to 1.0 volt, a typical value for the voltage across the collector-emitter junction of a transistor. As a result, the voltage across Zener diode 13 is less than the Zener or breakdown voltage 3.7 volts and the Zener diode is open. This causes the loop current to be by-passed through transistor 11 and no current flows through selector magnet coil 14, representing a "space" signal. Actually, a very small current flows in the selector magnet circuit due to the leakage current of Zener diode 13, but its value is of the order of microamperes and, thus, not significant.

Figure 4:
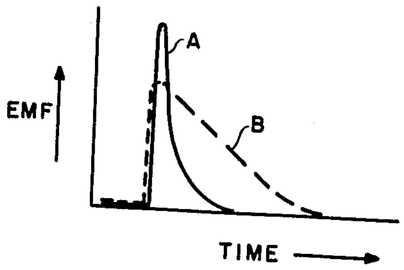
FIGURE 4 shows typical waveforms of the induced E.M.F. in a selector magnet under two different circuit conditions.

The just-described circuit performs very satisfactorily in 60 w.p.m. teletypewriter systems, but because a selector magnet of higher inductance is needed in a 100 w.p.m. system to provide faster action of the page printer mechanism, the back E.M.F. surge across the coil 14 during turn-off of the current pulse must reach a higher value to give the faster turnoff. This is illustrated in FIGURE 4, waveform A showing that a back E.M.F. which has been allowed to reach a higher voltage level prior to dissipation, dissipates at a faster rate than waveform B which was not allowed to reach as high a voltage level prior to dissipation. Hence, two factors are important in squaring the baud or current pulse shown in FIGURE 2, a substantially constant current to insure fast rise time, and circuitry to allow the induced E.M.F. to obtain a high enough value to insure a fast fall time. The circuit factor which determines the maximum back E.M.F. level is the impedance of the back E.M.F. path. In the circuit of FIGURE 3, the Zener voltage of diode 13 represents the peak value that the back E.M.F. will reach before dissipating. This causes a short time lag between the turn-on of transistor 11 and the turn-off of the Zener diode. During this short time interval, which occurs at the end of a current pulse in selector magnet 14, the back E.M.F. sees a circuit loop through Zener diode 13 and conducting transistor 11 to the reference point to which the other end of the magnet coil is connected. If the circuit of FIGURE 3 were used in a 100 w.p.m. teletypewriter system, the fall time would resemble waveform B in FIGURE 4.

Figure 5:
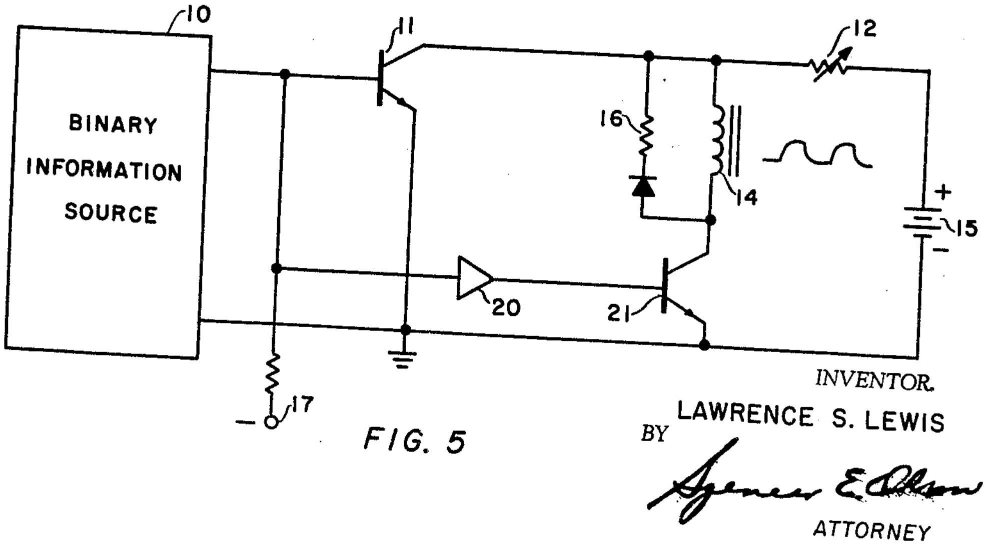
FIGURE 5 is a schematic diagram of a teletypewriter selector magnet circuit incorporating a second embodiment of the present control circuit.

To overcome this problem in a 100 w.p.m. system, a fast switch, alternately actuated by the input information signal, may be connected to the negative side of selector magnet coil 14. If the switch acts fast enough to prevent current division at the end of the selector magnet output pulse, coil 14 will not be connected to the reference point during fall time and the back E.M.F. will see voltage supply 15 as the value to which it can rise. The circuit of FIGURE 5 provides such a switching function and provides satisfactory fall time characteristics, resembling waveform A in FIGURE 4, at 100 words per minute. Binary information from the source 10 is applied across the base-emitter junction of transistor 11 (which may be of a conventional, low-voltage type) and is also coupled through an inverter 20 across the base-emitter junction of a second transistor 21. Negative bias source 17 may be connected to the base of transistor 11, as in FIGURE 3, to keep transistor 11 normally "off." Inverter 20 is designed to provide a positive output voltage to the base of transistor 21 in the absence of an input signal, or during a "mark" input, so that transistor 21 is normally conducting. The collector of transistor 11 is connected to one terminal of coil 14 and the collector of transistor 21 is connected to the other terminal of coil 14. The junction of the collector of transistor 11 and one terminal of coil 14 is connected through resistor 12 to the positive terminal of voltage supply 15. The negative terminal of voltage supply 15, the emitters of transistors 21 and 11 and one terminal of binary information source 10 are all connected to a common reference point, shown as ground. A surge-limiting circuit 16 is connected across selector magnet coil 14 to protect the transistors, and is designed to limit the induced E.M.F. to the value necessary to insure a rapid dissipation of the energy in coil 14, as previously described with reference to FIGURE 4. The collector voltage rating of transistor 21 is therefore determined by the value to which the back E.M.F. is limited by network 16. For example, a 60 volt transistor has been found to be satisfactory in a 100 w.p.m. system. Hence, the voltage rating of transistor 21, even though higher than that of transistor 11, is well within the realm of standard available component types; special non-standard components are not required.

In operation, the train of binary valued voltage bits from binary information source 10 is applied directly to the base of transistor 11 and inverted prior to application to the base of transistor 21. As a result, when transistor 11 is cut off, transistor 21 is caused to conduct to saturation and the selector magnet 14 is in the "mark" condition with a constant current flowing through it. The collector voltage $E_C$ of transistor 11 equals the sum of the relatively small voltage drops across selector magnet 14 and conducting transistor 21. When transistor 11 is caused to conduct to saturation, transistor 21 is cut off immediately. This, in conjunction with the action of the surge-limiting circuitry 16, causes a rapid dissipation of the energy in selector magnet coil 14. No current flows through the selector magnet 14 and a "space" signal is recognized by the teletypewriter readout equipment. The peak collector voltage $E_C$ requirement of transistor 21 is limited to the surge voltage which will cause network 16 to conduct.

From the foregoing it is seen that an efficient, reliable, noise-free, substantially constant current pulse control circuit has been provided which is relatively simple and inexpensive. In essence, the invention comprises the use of a constant current source, a load loop including a semiconductor switch, and a load current bypass loop including another semiconductor switch. The load switch and the by-pass switch are synchronized so that when the by-pass switch is conducting the load switch is open, and when the load switch is conducting the by-pass switch is open. In this manner, the voltage ratings of the switches can have relatively low values even though a high voltage source is used to obtain a constant current. The invention provides a particularly suitable means for controlling the current pulses in a teletypewriter selector magnet without the use of tubes, relays, or special components, and therefore contributes significantly toward obtaining an economically feasible, all solid-state teletypewriter system.

Although the circuits of FIGURES 3 and 5 have been described as using NPN transistors, it is to be understood that PNP transistors may be used with voltage supply 15, surge limiting network 16, and input signal reversed in polarity. Further, Zener diode 13 in FIGURE 2 may be replaced with a conventional diode and a biasing circuit to set the switching voltage. Also, the function of inverter 20 in the circuits of FIGURE 5 can be achieved in other ways. For example, the source 10 of binary information signals may have as its output stage a bistable multivibrator, which provides at its two output terminals signals which are inverted relative to each other. Thus, if one of the output terminals is connected to the base of transistor 11 and the other connected to the base of transistor 21, the described alternate switching will result.

While there has been disclosed what is at present considered to be preferred embodiments of the invention, it is obvious that various modifications and changes may be made therein without departing from the intended scope of the invention as defined in the appended claims.

What is claimed is:

1. A pulse control circuit comprising, in combination, a source of substantially constant current having first and second terminals, a first transistor having base, emitter and collector electrodes, means connecting the emitter electrode of said first transistor to said first terminal, a load connected between the collector electrode of said first transistor and said second terminal, a second transistor having base, emitter and collector electrodes, means connecting the collector electrode of said second transistor to said second terminal, means connecting the emitter electrode of said second transistor to the emitter electrode of said first transistor, a source of binary signals connected across the base and emitter electrodes of said second transistor to control the on-off conduction of said second transistor, and an inverter connected between the base electrode of said second transistor and the base electrode of said first transistor to control the on-off conduction of said first transistor in alternate synchronism with respect to said second transistor.

2. A pulse control circuit comprising, a source of direct current potential having first and second terminals, a first transistor having base, emitter and collector electrodes, means connecting the emitter electrode of said first transistor to said first terminal, a primarily inductive load and a resistor serially connected in that order between the collector electrode of said first transistor and said second terminal, said source of potential and said resistor establishing a source of substantially constant current for said load, a second transistor having base, emitter and collector electrodes, means connecting the collector electrode of said second transistor to the junction of said load and said resistor, means connecting the emitter electrode of said second transistor to the emitter electrode of said first transistor, a source of binary signals connected across the base and emitter electrodes of said second transistor to control the on-off conduction of said second transistor, and an inverter connected between the base electrode of said second transistor and the base electrode of said first transistor to control the on-off conduction of said first transistor in alternate synchronism with respect to said second transistor.

3. A circuit for controlling current pulses in the winding of an electromagnet comprising, in combination, a source of substantially constant current having first and second terminals, a first transistor having base, emitter and collector electrodes, means connecting said first transistor in series with the winding of said electromagnet between said first and second terminals with the emitter of said first transistor connected to said second terminal, a second transistor having base, emitter and collector electrodes, means connecting the collector electrode of said second transistor to said first terminal, means connecting the emitter electrode of said second transistor to said second terminal, a signal source operative to produce first and second binary signals inverted relative to each other, and means applying said first and second binary signals across the base and emitter electrodes of said first and second transistors, respectively, said first binary signal being operative to turn said first transistor on and off in alternate synchronism with respect to said second transistor.

4. A circuit according to claim 3 wherein said current source comprises a source of direct current potential and a resistor connected in that order between said second and said first terminals, said source of potential and said resistor having values related to the resistance of the other components of the circuits to establish a substantially constant current in said winding.

(References on following page)

References Cited by the Examiner

UNITED STATES PATENTS

| | | | |
|---|---|---|---|
| 2,732,494 | 1/56 | Hall | 328—210 X |
| 2,821,627 | 1/58 | Pitchard | 328—101 X |
| 2,825,821 | 3/58 | Logue | 307—88.5 |
| 3,011,066 | 11/61 | Vogelsong | 307—88.5 |
| 3,066,229 | 11/62 | Cody | 307—88.5 |
| 3,069,567 | 12/62 | Lewis | 328—101 X |

FOREIGN PATENTS

| | | |
|---|---|---|
| 127,712 | 4/32 | Austria. |

OTHER REFERENCES

Electronic Design, March 19, 1958, Zener Diode Characteristics (page 27 relied on).

ARTHUR GAUSS, *Primary Examiner.*